United States Patent [19]

Morimoto et al.

[11] 4,383,306
[45] May 10, 1983

[54] ELECTRONIC TRANSLATOR FOR INDICATING THE KIND OF TRANSLATED TONGUE

[75] Inventors: Masafumi Morimoto, Yamatokoriyama; Kunio Yoshida; Tosaku Nakanishi, both of Nara, all of Japan

[73] Assignee: Sharp, Kabushiki Kaisha, Osaka, Japan

[21] Appl. No.: 252,145

[22] Filed: Apr. 8, 1981

[30] Foreign Application Priority Data

Apr. 14, 1980 [JP] Japan .................................. 55-49408

[51] Int. Cl.³ .............................................. G06F 15/38
[52] U.S. Cl. ....................................... 364/900; 364/419
[58] Field of Search ... 364/200 MS File, 900 MS File, 364/419, 709, 715

[56] References Cited

U.S. PATENT DOCUMENTS

| | | | |
|---|---|---|---|
| 3,932,859 | 1/1976 | Kyriakides | 364/900 |
| 4,130,882 | 12/1978 | Swanstrom | 364/900 |
| 4,158,236 | 6/1979 | Levy | 364/900 |
| 4,159,536 | 6/1979 | Kehoe | 364/900 |
| 4,218,760 | 8/1980 | Levy | 364/900 |

FOREIGN PATENT DOCUMENTS 1448211  9/1976  United Kingdom ............... 364/900

OTHER PUBLICATIONS

Kraft, G. D., Toy, W. N., *Microprogrammed Control and Reliable Design of Small Computers,* Englewood Cliffs, N.J., Prentice-Hall, 1981, pp. 3-6.

*Primary Examiner*—Joseph F. Ruggiero
*Assistant Examiner*—Michael R. Fleming
*Attorney, Agent, or Firm*—Birch, Stewart, Kolasch & Birch

[57] ABSTRACT

An electronic translator in which a first word or words represented in a first language are entered to obtain a second word or words represented in a second language but equivalent in meaning to the first word or words, comprises an input device for entering the first word or words, a memory for storing the second word or words, an access device for addressing the memory to cause retrieval of the second words or words corresponding in meaning to said first word or words, a detection device for detecting the kinds of the first language and the second language, and a display responsive to the detection device for displaying the kinds of the first language and the second language, the display means further displaying the second words or words.

4 Claims, 14 Drawing Figures

| KEY OPERATION | KIND OF LANGUAGE INDICATION | | |
|---|---|---|---|
| | ENG | GER | JPN |
| (POWER ON) | ▲ | | ▼ |
| [LNG] | | ▼ | ▲ |
| [LNG] | ▼ | ▲ | |
| [LNG] | ▲ | | ▼ |
| [▲▼] | ▼ | | ▲ |

ELECTRONIC TRANSLATOR FOR INDICATING THE KIND OF TRANSLATED TONGUE

BACKGROUND OF THE INVENTION

The present invention relates in general to a word information storage and retrieval device and, more particularly, to an electronic translator for providing efficient and rapid retrieval of any desired word or words stored therein.

Recently, a new type of electronic device called an electronic translator has been available on the market. The electronic translator differs from conventional types of electronic devices in that the former is of a unique structure which provides for efficient and rapid retrieval of word information stored in a memory.

Since the conventional translator has not previously been able to indicate the translated tongue being used by the translator, it is desirable to produce a translator which can indicate the translated tongue to enhance the translator's operation.

SUMMARY OF THE INVENTION

Accordingly, it is an object of the present invention to provide an improved electronic translator for indicating the translated tongue being generated thereby.

It is another object of the present invention to provide an improved electronic translator for showing the mother tongue and foreign tongue being generated thereby.

Briefly, an electronic translator of the present invention is described in which a first word or words represented in a first language are entered to obtain a second word or words represented in a second language equivalent to the first word or words. The translator comprises an input device for entering the first word or words, a memory for memorizing the second word or words, an access device for addressing the memory to cause retrieval of the second word or words, a detection device for detecting the first language and the second language, and a display responsive to the detection device for displaying the first language and the second language, the display means further displaying the second word or words.

BRIEF DESCRIPTION OF THE DRAWINGS

The present invention will become more fully understood from the detailed description given hereinbelow and accompanying drawings which are given by way of illustration only, and thus are not limitative of the present invention and wherein:

FIGS. 5(a) and 5(b) show a sequence by a key operation; and

DESCRIPTION OF THE INVENTION

First of all, any language can be applied to an electronic translator of the present invention. An input word is spelled in a specific language to obtain an equivalent word, or a translated word spelled in a different language corresponding thereto. The languages may be freely selected.

Figure 1:
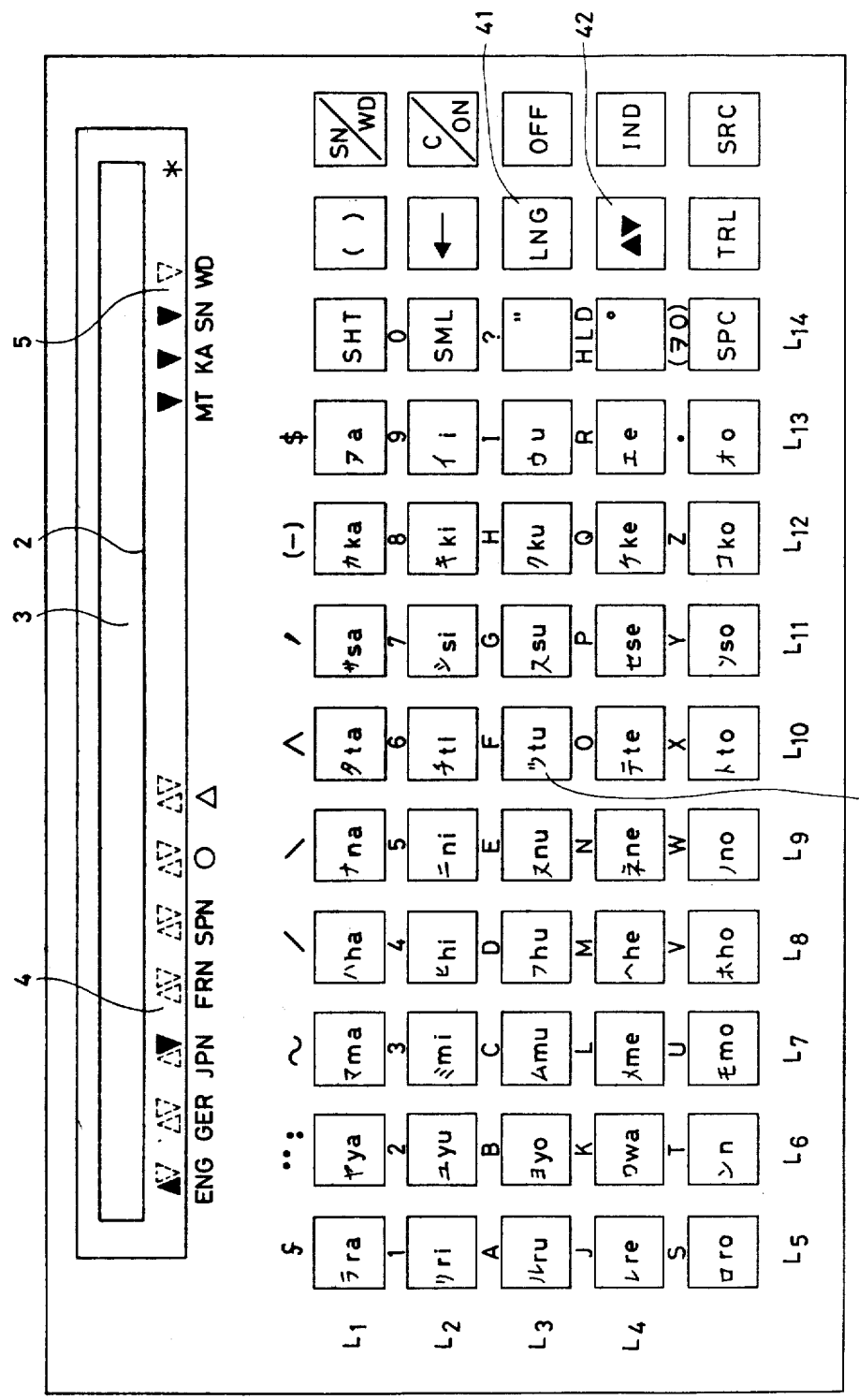
FIG. 1 shows a plan view of an electronic translator according to the present invention.

Referring now to FIG. 1, there is illustrated an electronic translator according to the present invention. The translator comprises a keyboard 1 containing a Japanese syllabery keyboard, an alphabetical keyboard, a symbol keyboard, and a functional keyboard, an indicator 2 including a character indicator 3, a kind of tongue indicator 4 and a symbol indicator 5.

The character indicator 3 shows characters being processed by this translator. The kind of tongue indicator 4 shows symbols used for representing the mother tongue and the foreign tongue processed by the translator. The symbol indicator 5 shows symbols used for indicating operating conditions in this translator.

Figure 2:
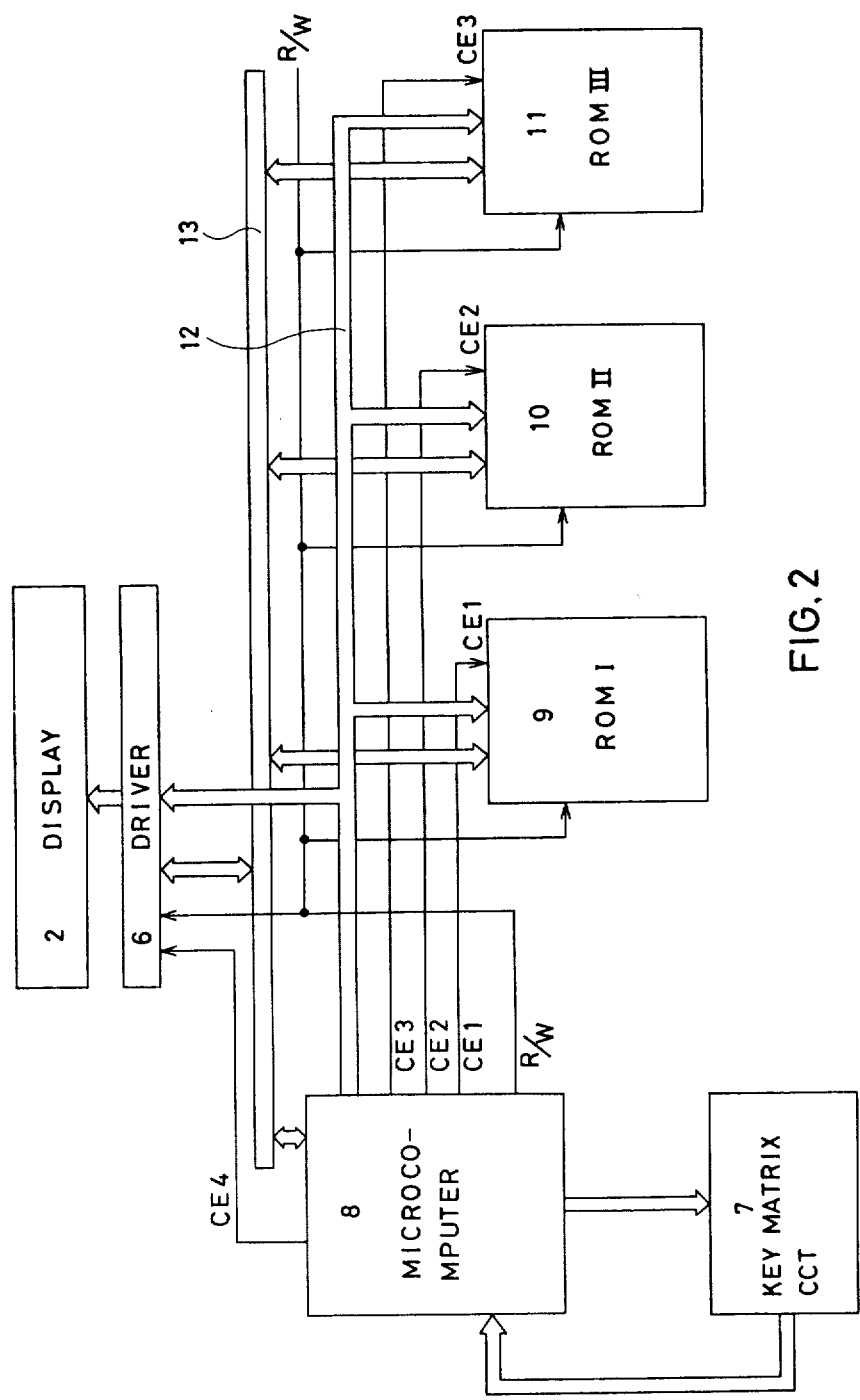
FIGS. 2, 3(a) and 3(b) show block diagram of a control circuit implemented within the translator as shown in FIG. 1.

FIG. 2 shows a block diagram of a control circuit implemented in the translator. The circuit comprises the indicator 2, a driver 6, a key matrix circuit 7, a microcomputer 8, a ROM I 9, a ROM II 10, and ROM III 11. The circuit 7 functions for the keyboard 1 of FIG. 1. The circuit 7 is connected to terminals of the microcomputer 8 for developing key strobe signals and key input signals. Each of the ROMs 9 to 11 contains words and/or sentences used by the translator.

According to a preferable example of the present invention, each of the ROMs 9 to 11 corresponds to one kind of language. For example, the ROM I 9 stores a plurality of English words, the ROM II 10 stores a number of Japanese words and the ROM III 11 stores a number of German words. Preferably, the ROM I 9 is built in the translator so that it cannot be removed from the translator for exchange purposes. However, each of the ROM II 10 and the ROM III 11 can be removed from the translator and replaced by another type of ROM as module ① or ②.

Each of the ROMs 9 to 11 is connected to the microcomputer 8 through an address bus 12 and a data bus 13. Chip selection signals $CE_1$, $CE_2$ and $CE_3$ are developed by the microcomputer 8 to select one of the ROMs 9 to 11. Words and/or sentences are applied to the microcomputer 8 from the selected ROM. $CE_4$ indicates a chip selection signal for the driver 6. R/W indicates a read/write signal for selecting read or write operation.

Figure 3:
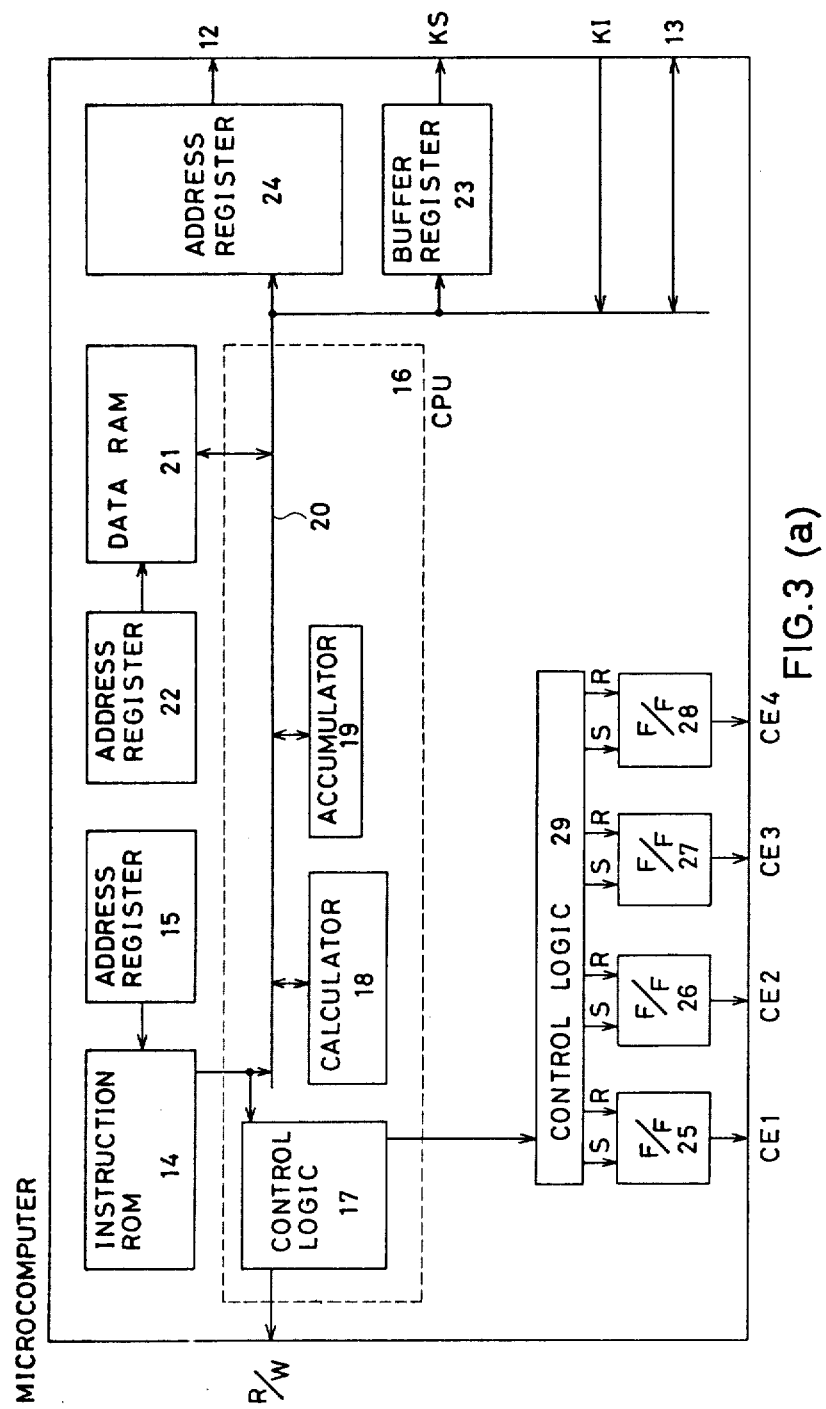
Figure 3:
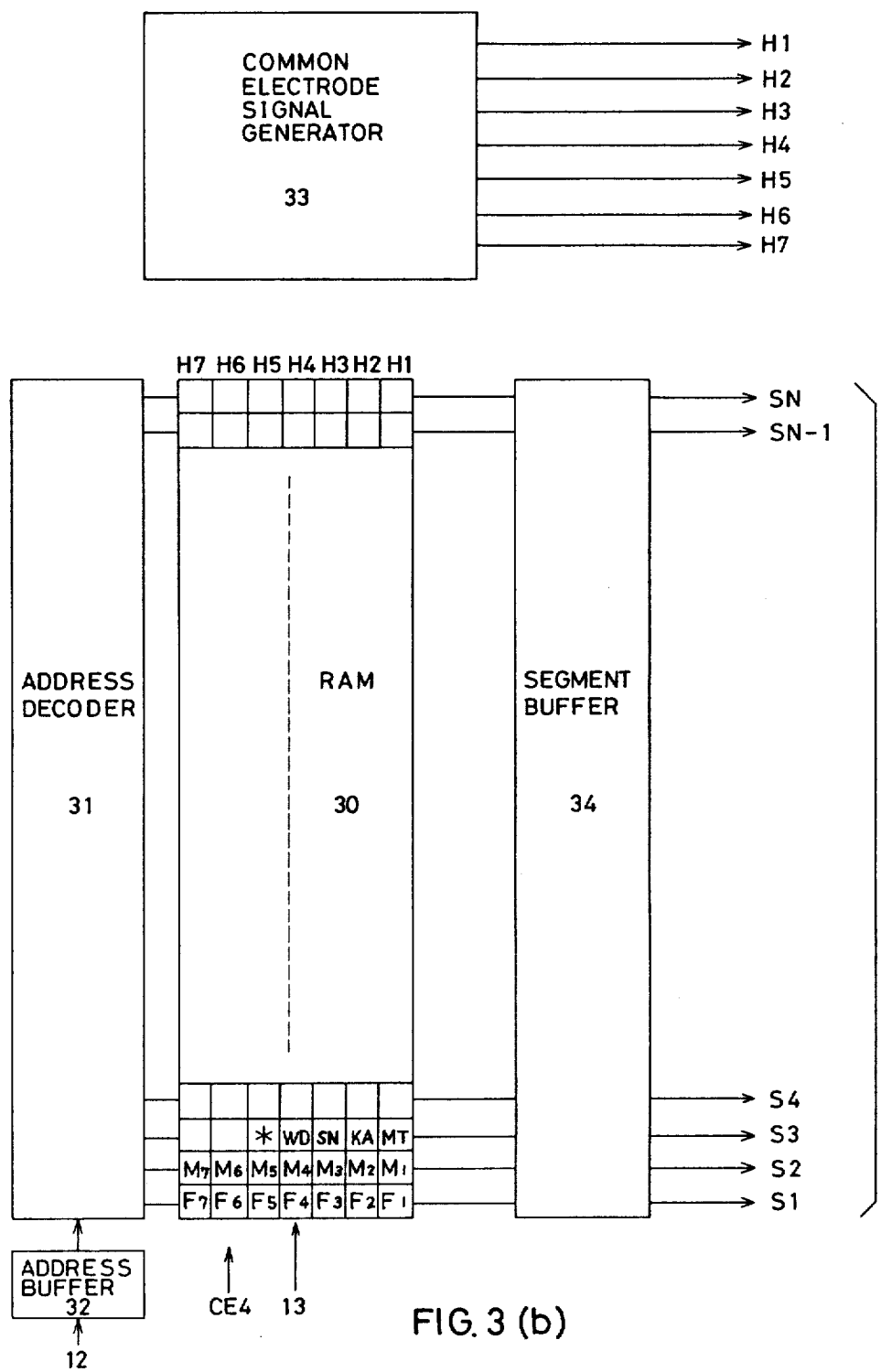

FIG. 3(a) shows a block diagram of the microcomputer 8 of FIG. 2. An instruction ROM 14 stores a number of kinds of instructions each of which is used for a specific operation by the translator and is, preferably, in a coded format. As the address of a ROM address register 15 is in turn advanced, the ROM 14 provides a specific kind of instruction. The specific instruction is applied to a CPU 16 so that the CPU 16 understands the instruction to provide the selected operation.

The CPU 16 comprises a control logic circuit 17, a logic calculator 18, and an accumulator 19. An inner data bus is indicated by numeral 20. A data RAM 21 is provided for preliminarily containing data used for the translator and for functioning as a conditional flip flop used for branches in the program operation. Data from the CPU 16 is stored in a specific location within the data RAM 21 which is selected by a RAM address register 22. The data stored in such a location of the RAM 21 is provided to the CPU 16.

Numeral 23 represents an output buffer register for outputting key strobe signals KS entered into the key matrix circuit 7 so that the output of this circuit 7 is applied to the CPU 16 as key input signals KI. Numeral 24 indicates an address register for selecting the address of the external memory including the ROMs 9 to 11 and a RAM circuit within the driver 6. The output of the address register 24 is fed through the address bus 12. Control of the address register 24 to increment or decrement to a certain address is carried out by the CPU 16. Since the CPU 16 is coupled to the data bus 13 as shown in FIG. 2, transmission of the data between the CPU 16 and the external memory is conducted by using the data bus 13. The direction of transmission of the data between them is defined by the read write signal R/W.

Each of flip flop circuits 25 to 28 is set or reset by a control logic circuit 29. The control logic circuit 29 is controlled by the CPU 16. The output of each of the flip flop 25 to 28 is referred to as a chip selection signal $CE_1$ to $CE_4$.

FIG. 3(b) shows a block diagram of the driver 6 of FIG. 2. According to a preferable form of the present invention, the indicator 2 comprises a liquid crystal display. The character indicator 3 is formed with a 5×7 dot matrix for each single digit. One symbol of the kind of tongue indicator 4 and the symbol indicator 5 is formed with a single digit.

The driver 6 comprises a RAM 30, an address decoder 31, an address buffer 32, a common electrode signal generator 33, and a segment buffer 34. Each bit of the RAM 30 corresponds to each dot (segment) of the indicator 2. That is, when a "1" is written in a certain bit of the RAM 30, a particular dot (segment) of the indicator 2 corresponding to the certain bit is indicated. When information of "0" is stored in a certain bit of the RAM 30, a particular dot (segment) of the indicator 2 corresponding to the bit is left dark.

In FIG. 3(b), $S_1$, $S_2$ and $S_3$ are referred to segment electrode signals used for illuminating symbols. $S_4$ to $S_N$ are referred to segment electrode signals used for indicating characters. $H_1$ to $H_7$ represent common electrode signals. $M_1$ to $M_7$ represents a symbol "▲" of the kind of tongue indicator 4, the symbol indicating the mother tongue or the original tongue which is not to be translated with the translator of the present invention. $F_1$ to $F_7$ represent another symbol "▼" of the same indicator 4, this symbol indicating the foreign tongue or the translated tongue which is to be translated with the translator of the present invention.

Further in FIG. 3(b), numerals 1 to 7 as the suffix are referred to English, German, Japanese, French, Spanish, another language "◯", and further language "Δ", respectively. MT indicates a multivocal word. KA indicates a Japanese "Katakana" letter. SN represents a sentence while WD represents a word. A star "*" indicates that each of words represented in the mother tongue or the original tongue is translated to each of corresponding words represented in the foreign tongue or the translated tongue while the grammatical correction and modification for the foreign tongue is not carried out.

The driver 6 provides displaying signals to the indicator 2 when displaying data are developed from the microcomputer 8 to apply them to the RAM 30. Since the driver 6 is of the conventional, further description is omitted.

Figure 4:
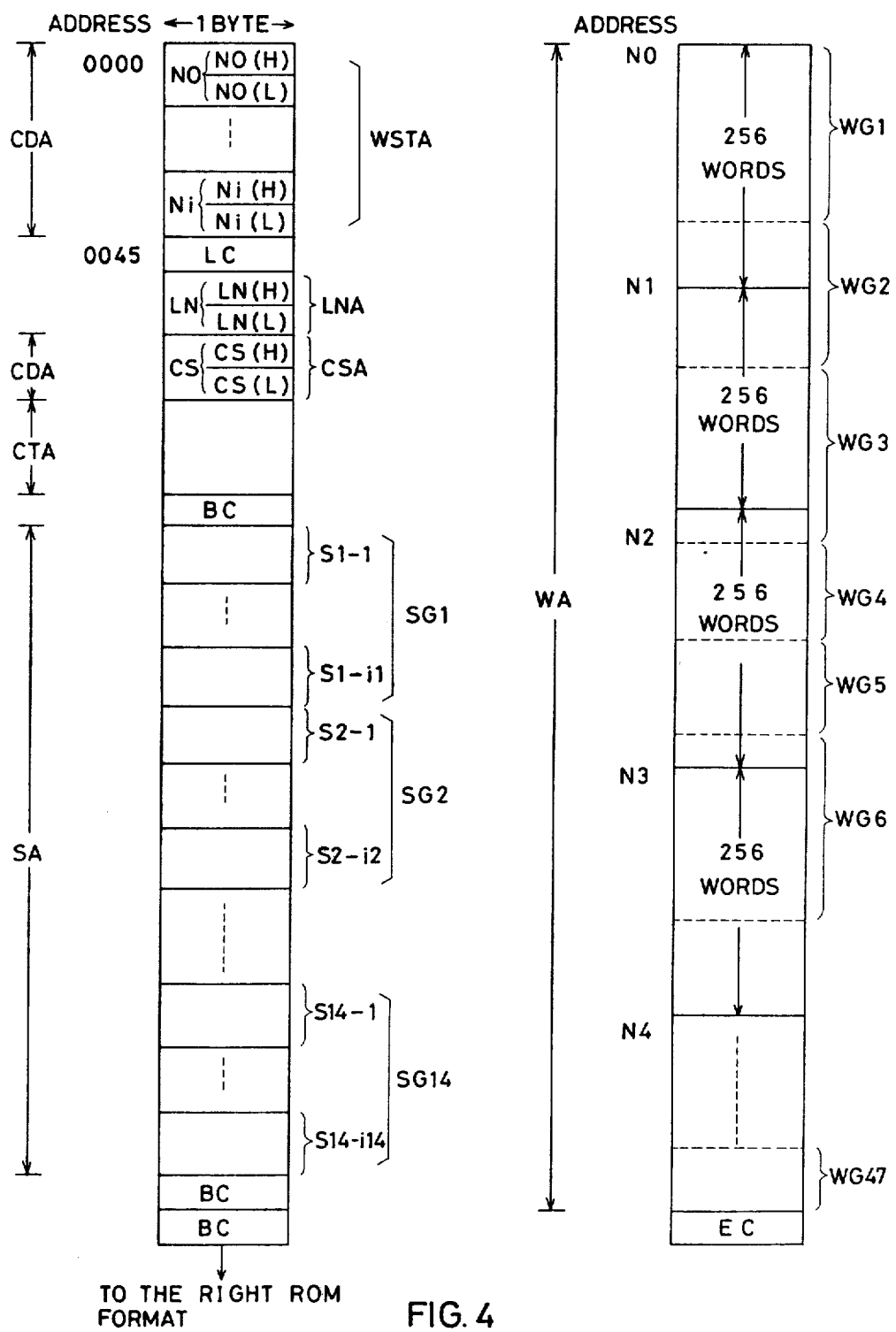
FIG. 4 shows a format of a ROM for memorizing words, the ROM being connected in the circuit of FIG. 2.

FIG. 4 shows a format in which a great number of words are stored in each of the ROMs 9 to 11. This format contains a control data region CDA, a data-compression table CTA, a sentence data region SA and a word data region WA.

Each of the words is stored in the ROM such that its spelling is compressed. For example, in the ROM I 9, a pair of words "AN" is stored as a compressed code of 1 byte, $CC_1$. Another pair of words "BA" is stored as a compressed code of 1 byte, $CC_2$. Frequency in occurrence of spelling of English words is determined to detect some English words requiring a high frequency of spelling. The thus selected English spelling is changed to corresponding compression codes for memorizing purposes. The data-compression table CTA stores data for producing correspondence between the selected spelling and the compression codes.

When correspondence between an input words and one or more words memorized in one of the ROMs is detected, the input word is changed to word inclusive of one of the compression codes according to the contents of the data-compression table CTA since each of the ROMs stores codes which may include one of the compression codes. The table CTA is used to show words stored in one of the ROMs by changing the codes to the original spelling. The table is different depending on the kind of language to make the degree of data compression the greatest.

Stored words are classified as 47 categories in each of which a number of words are ordered. In FIG. 4, a word category n is referred to WGn. Sentences are formed by a combination of a plurality of stored words. These sentences are classified as 14 categories in each of which a number of sentences are ordered. In FIG. 4, a sentence category m is referred to SGm containing a first sentence $S_{m-1}$ to a last sentence $S_{m-im}$. Each of the categories belonging to each of the word categories WG1 to WG14 corresponds to each of the sentence categories SG1 to SG14.

The following table shows a relation between the serial number of the category and the name of the category.

TABLE 1-1

| The serial number of the category | corresponding key | the name of the category |
|---|---|---|
| 1 | "ra" or "Q" | airplane |
| 2 | "ri" or "I" | customs |
| 3 | "ru" or "A" | transporting machine |
| 4 | "re" or "J" | at hotel |
| 5 | "ro" or "S" | in restrant |
| 6 | "m" or "T" | sight seeing |
| 7 | "mo" or "U" | amuzement |
| 8 | "ho" or "V" | shopping |
| 9 | "no" or "W" | direction |
| 10 | "to" or "X" | business |
| 11 | "so" or "Y" | service |
| 12 | "ko" or "Z" | conversation |
| 13 | "O" or "." | at medical practitioner's Office |
| 14 | "SPC" or "o" | emergency |

Each category for the words contains 256 words. A first word address table region WSTA contains a first address referred to $N_0$, $N_1$, $N_2$, ... $N_4$ in FIG. 4. This first address is related to a location in which first codes or first compressed code for representing the first word is stored. In accordance with a specific example of the present invention, each address is represented with two bytes. Each first address is separated to an upper byte referred to $N_0(H)$ to $N_i(H)$ and a lower byte referred to $N_0(L)$ to $N_i(L)$. The first word address table region is used to shorten retrieval time for a specific word.

CS is referred to a first sentence address CS(H) and CS(L) which is stored in a first sentence address region CSA. LNA indicates a memory location for storing a serial number corresponding to one of the words indicating the kind of a specific tongue as referred to LN of LN(H) and LN(L). More particularly, as the ROM storing English words is concerned, a word "English" is necessarily contained in that ROM. In such a case, the word "English" is stored in the ROM as a serial number LN as the first word of a serially stored number of words of a word group having the same language type.

Memorizing the serial number LN is suitable for showing the kind of the mother tongue and the foreign tongue being selected in the character indicator 3 because it is unnecessary to additionally memorize a word showing the kind of tongue.

The translator of the present invention may comprise audible sound generating means for developing words represented in the mother tongue and/or the foreign tongue. Since such an audible sound genrating means is disclosed in, for example, Hyatt U.S. Pat. No. 4,060,848 issued Nov. 29, 1979, further description is omitted.

In FIG. 4, LC indicates a tongue code in which the upper 4 bits indicate a field of language stored in the ROM and lower 4 bits the kind of language stored in the ROM. In particular, there may be present a ROM for storing words oriented to economy, engineering or medicine, respectively. Information representing such a field is stored in LC. The lower 4 bits corresponds to each kind of tongue as follows:

TABLE 1-2

| The lower 4 bits | the kind of language |
|---|---|
| 0 0 0 1 (1) | English |
| 0 0 1 0 (2) | German |
| 0 0 1 1 (3) | Japanese |
| 0 1 0 0 (4) | French |
| 0 1 0 1 (5) | Spanish |
| 0 1 1 0 (6) | another tongue "O" |
| 0 1 1 1 (7) | a further tongue "▲" |

In FIG. 4, BC, "11111111" is a boundary code and EC "11111111" is an end code of the ROM.

A specific combination of the symbols "▲" and "▼" in the kind of tongue indicator 4 in FIG. 1 is desirably controlled and changed by actuation of a LNG key 41 and a reversible key 42. The specific combination of the symbol "▲" marked above ENG meaning "English" and the symbol "▼" marked above JPN meaning "Japanese" as shown in FIG. 1, indicates translation from English to Japanese. The mark "▲" is related to M1 through M7 in FIG. 3(b). When one of M1 through M7 is placed in a level, e.g., a high level "1," this mark is allotted to a corresponding kind of language and indicated. The mark "▼" is related to F1 through F7 in FIG. 3(b) so that when one of F1 to F7 is placed in a level, e.g., a high level "1," this mark is allotted to a corresponding kind of language and indicated.

In the case where at least one of the ROMs 9 to 11 is removed for exchange purposes, these marks "▲" and "▼" are correctly allotted to a corresponding kind of language which is attached to the translator. In this preferable form of the present invention, each of the ROM 1, ROM II, and ROM III stores words of English, Japanese, and German. In this case, upon supply of power to the translator, the mother tongue is English and the foreign tongue is Japanese as shown in FIG. 1. The reversible key 42 is actuated for reversing the mother tongue and the foreign tongue each other.

Figures 5, 5A:
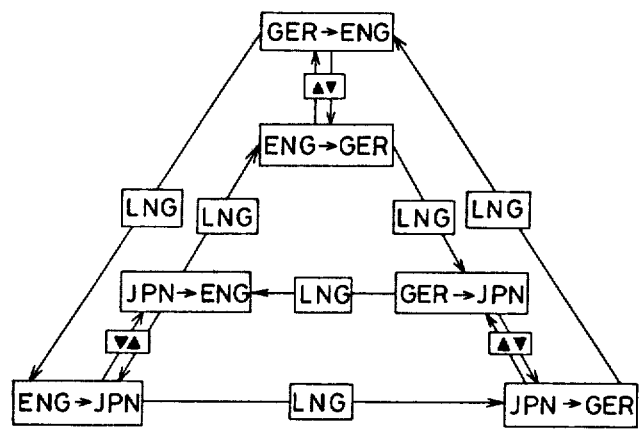

FIG. 5(a) shows a relationship between key operation of the LNG key 41 and the reversible key 42 and indication in the kind of tongue indicator 4. FIG. 5(b) shows a sequence of control by operating these keys 41 and 42. In FIG. 5(b), "ENG→GER" represents that English referred to ENG is the mother tongue and German referred to GER is the foreign tongue.

Figure 6:
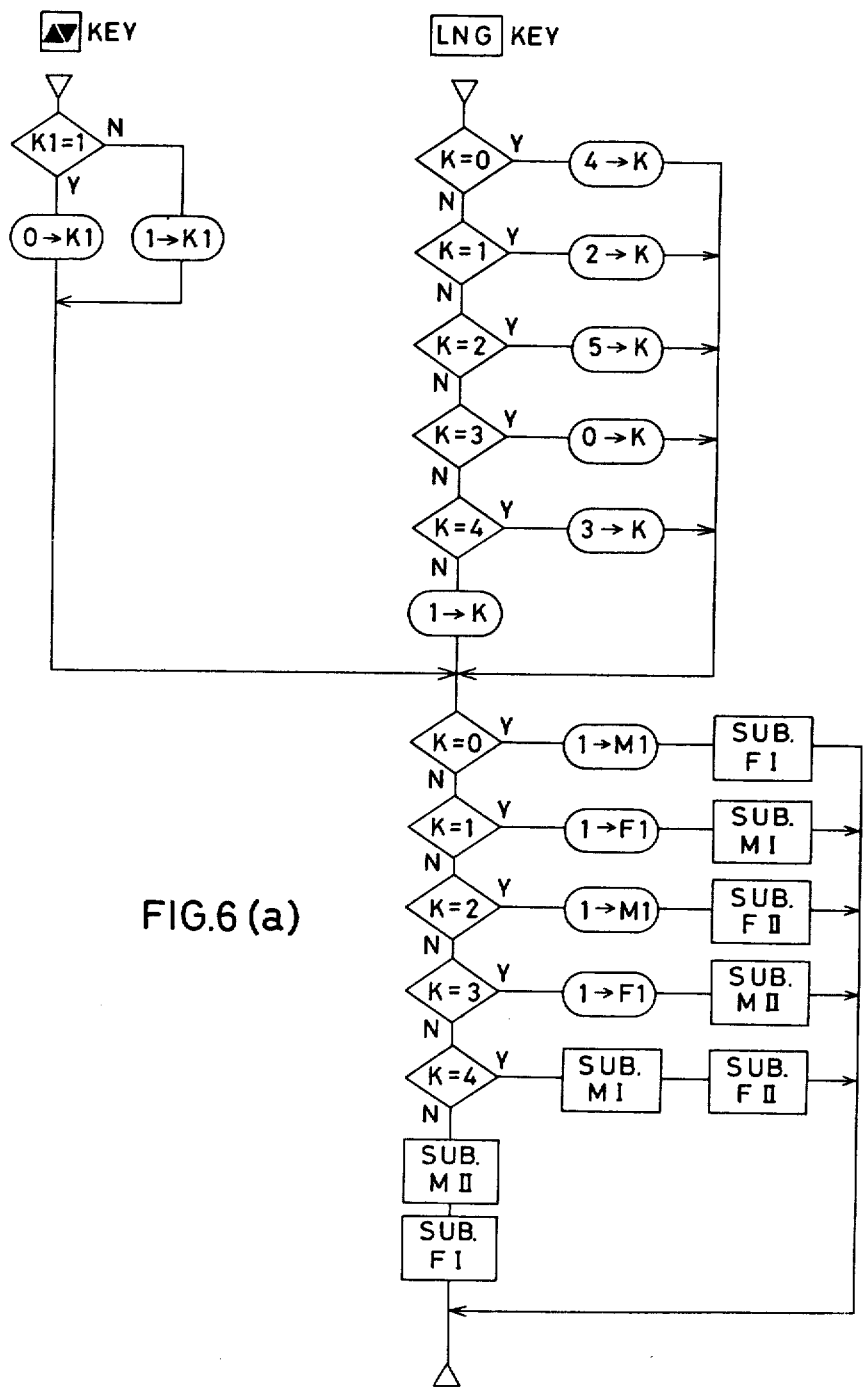
FIGS. 6(a) through 6(g) show flow charts of the translator.

FIG. 6 shows a flow chart in which the above language selection and indication are operated according to the present invention. In FIG. 6, K($K_1$, $K_2$, $K_3$, $K_4$) $MD_1$ and $MD_2$ indicate parts of RAM of 4 bits all of which are contained within the data RAM 21 of FIG. 3(a). The RAM K is provided for containing combinations of the mother tongues and the foreign tongues in the three kinds of tongue. The RAM $MD_1$ stores the lower 4 bits indicating each tongue in the ROM II. The RAM $MD_2$ stores the lower 4 bits indicating each kind of tongue in the ROM III. $F_1$ through $F_7$ and $M_1$ through $M_7$ are bits of the RAM 30 of FIG. 3(b).

The combinations stored in the RAM portion K are as follows:

| K | | | | | |
|---|---|---|---|---|---|
| $K_4$ | $K_3$ | $K_2$ | $K_1$ | the mother tongue | the foreign tongue |
| 0 | 0 | 0 | 0 | English | the tongue in the ROM II |
| 0 | 0 | 0 | 1 | the tongue in the ROM II | English |
| 0 | 0 | 1 | 0 | English | the tongue in the ROM III |
| 0 | 0 | 1 | 1 | the tongue in the ROM III | English |
| 0 | 1 | 0 | 0 | the tongue in the ROM II | the tongue in the ROM III |
| 0 | 1 | 0 | 1 | the tongue in the ROM III | the tongue in the ROM II |

Figure 6:
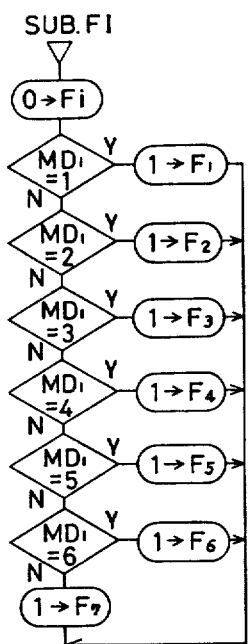
Figure 6:
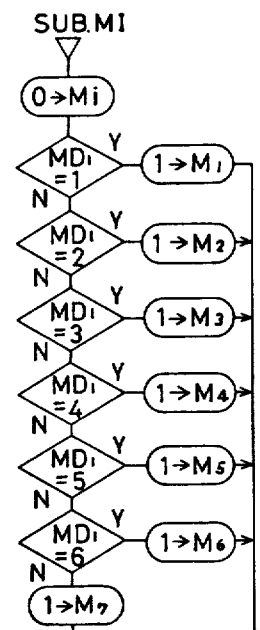
Figure 6:
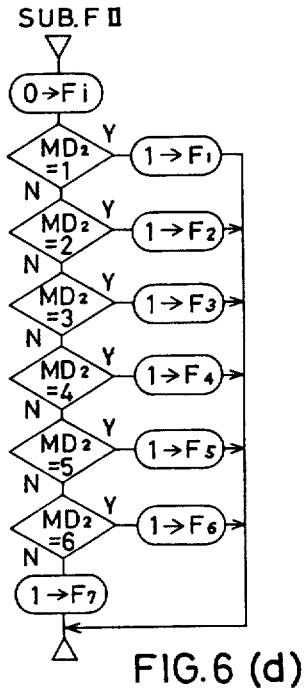
Figure 6:
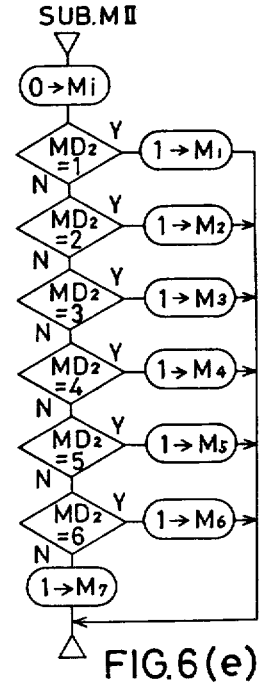
Figure 6F:
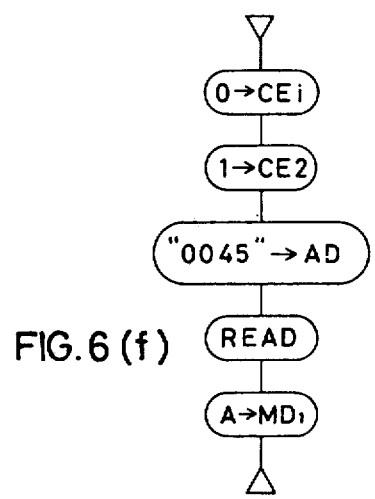
Figure 6G:
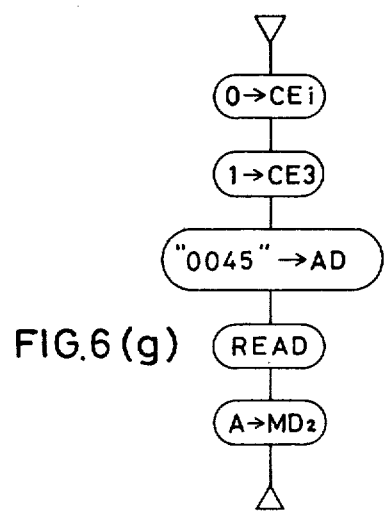

(1) Operation for reading in the lower 4 bits indicating the kind of tongue:

FIGS. 6(f) and 6(g) show flow charts for this purpose. In these drawings, the flip flop circuits 25 through 28 are indicated as $CE_1$ through $CE_4$, respectively, the address register 24 for the external memory is indicated as AD, and the accumulator 19 is represented as A.

With reference to FIG. 6(f), all of the flip flops $CE_1$ through $CE_4$ are reset as referred to 0→$CE_i$. Only $CE_2$ is set as referred to 1→$CE_2$. Therefore, the chip selection signal $CE_2$ is generated to select the ROM II. The address storing the code indicating the kind of tongue, e.g., "0045" is applied to the address register AD as referred to "0045"→AD. The kind of tongue code is entered to the accumulator A as represented as "READ." The lower 4 bits now contained in A, of the kind of tongue code, are applied to $MD_1$ as referred to A→$MD_1$.

The similar operation in connection with $MD_2$ is conducted as indicated in FIG. 6(g).

(2) Operation by actuating the reversible key 42:

As shown in FIG. 6(a), application of the reversible key 42 enables the reversed condition of $K_1$ being the lowest bit of K. As indicated in Table 2, $K_1$ is used for selecting the difference between the mother tongue and the foreign tongue in the bilingual mode. When the code of $K_1$ is replaced by another kind of code, the indications of the the marks "▲" and "▼" in the kind of tongue indicator 4 are exchanged.

(3) Operation by actuating the LNG key 42:

Actuation of the key 41 enables change in the contents of K as shown in FIG. 6(a). This kind of change is related to the selection between the mother tongue and the foreign tongue in the three kinds of language as indicated in FIG. 5(b).

(4) Display operation in the kind of tongue indicator 4:

When either of the keys 41 and 42 is actuated, the display routine for the indicator 4 is selected as shown in FIG. 6(a) after the above items (2) and (3) are conducted. It is assumed that the display routine is selected on the condition of "K=3 (0011)." As shown in Table 2, "K=3" is related to the state that the mother tongue is the language in the ROM III and the foreign tongue is English. The routine of FIG. 6(a) is featured by making F1 set and conducting "SUB MII."

$F_1$ is related to the display symbol representing that English is the foreign tongue as shown in FIG. 3(b). Setting $F_1$ means that the display symbol is illuminated. "SUM M II" is indicated in the flow chart of FIG. 6(e), being characterized in that one of M1 through M7 is set according to the tongue code stored in $MD_2$ in connection with the ROM III. Since $M_1$ through $M_7$ are related to the mother togue indicating mark, there is indicated the condition of "K=3" that the mother tongue is the tongue in the ROM III and the foreign tongue is English.

FIGS. 6(a) through 6(e) show operations for other examples.

(5) Memory for selected modes of the mother tongue and the foreign tongue in a power off condition:

The data RAM 21 containing K, $MD_1$ and $MD_2$ continues to receive power even when the main switch of the translator is turned off. And so these codes are kept. When the main switch is turned on, the memorized codes enable the indication of the condition prior to the power off condition.

(6) Other:

The upper 4 bits of the tongue code represent the kind of field indicating the type of tongue in the ROM as described above. It is possible that there may be provided an additional display, similar to the kind of tongue indicator 4, for indicating the type of field by reading the upper 4 bits. It may be possible to detect all the types of field of ROMs are in common. If they are not in common, such a condition can be indicated in the additional display.

The data bus 13 in FIG. 2 is placed in the high level by resistor means. None of ROMs is set so that the accumulator 19 contains "FF" (hexadecimal form) when the tongue code is to be read-in. If the lower 4 bits of the tongue code does not have "F," the complete setting of the ROM module is assured and indicated by detecting presence of the data code of "FF."

While only certain embodiments of the present invention have been described, it will be apparent to those skilled in the art that various changes and modifications may be made therein without departing from the spirit and scope of the invention as claimed.

What is claimed is:

1. An electronic translator for converting a first word or words in a first language into a second word or words having an equivalent meaning in a second language, said first and second languages being selected from a plurality of languages greater than two, comprising:
   language selecting means for selecting said first and second languages from any of said plurality of languages greater than two;
   memory means storing a plurality of words in said plurality of languages therein, one of said plurality of words corresponding to said second word or words;
   access means responsive to said languages selected by said language selecting means for searching said memory means to discover and recall said second word or words in said second language corresponding in meaning to said first word or words in said first language; and
   display means responsive to said access means for displaying said second word or word recalled by said access means, said display means further displaying said first and second languages selected by said language selecting means.

2. The translator of claim 1 wherein said language selecting means includes language reversal mans for interchanging said first and second languages, when desired, so as to allow entry of said first word or word in said second language to access said second word or words in said first language.

3. The translator of claim 1, wherein said selecting means selects portions of said memory means having second word or words in said second language stored therein;
   said access means being responsive to said selecting means for determining the meaning of said first word or words in said first language and for causing retrieval of said second word or words in said second language corresponding in meaning thereto.

4. The translator of claim 3, wherein said language selection means comprises a microcomputer including:
   operational instruction means for containing and generating instructions for specific operations of the translator;
   address register means coupled to the operational instruction means for causing the operational instruction means to generate said instructions;
   central processor means responsive to the instructions for decoding the instructions and conducting said specific operations; and
   data memory means responsive to the central processor means for storing and generating data.

* * * * *